United States Patent

Policello et al.

[11] Patent Number: 5,968,872
[45] Date of Patent: *Oct. 19, 1999

[54] FOAM CONTROL AGENTS FOR SILICONE SURFACTANTS IN AGRICULTURE

[75] Inventors: George Policello, Ossining; Gerald Murphy, Hopewell Junction, both of N.Y.

[73] Assignee: Witco Corporation, Greenwich, Conn.

[ * ] Notice: This patent is subject to a terminal disclaimer.

[21] Appl. No.: 08/802,465

[22] Filed: Feb. 20, 1997

Related U.S. Application Data

[60] Continuation-in-part of application No. 08/449,452, May 24, 1995, Pat. No. 5,658,852, which is a division of application No. 08/135,916, Oct. 13, 1993, Pat. No. 5,561,099
[60] Provisional application No. 60/012,017, Feb. 21, 1996.

[51] Int. Cl.$^6$ .......................... A01N 55/10; C09K 17/38; B01D 19/04
[52] U.S. Cl. .......................... 504/116; 424/405; 516/198; 516/124; 516/204
[58] Field of Search .......................... 252/321, 358, 252/351; 424/405; 71/DIG. 1; 504/116; 516/124, 198, 204

[56] References Cited

U.S. PATENT DOCUMENTS

| | | | |
|---|---|---|---|
| 4,400,288 | 8/1983 | Dhanani et al. | 510/347 |
| 4,514,319 | 4/1985 | Kulkarni et al. | 252/321 |
| 4,656,162 | 4/1987 | Itoh et al. | 514/63 |
| 4,933,002 | 6/1990 | Petroff et al. | 71/DIG. 1 |
| 5,104,647 | 4/1992 | Policello | 514/772 |
| 5,504,054 | 4/1996 | Murphy | 504/116 |
| 5,558,806 | 9/1996 | Pollicello et al. | 516/204 |
| 5,561,099 | 10/1996 | Murphy et al. | 504/116 |
| 5,658,851 | 8/1997 | Murphy et al. | 504/116 |
| 5,658,852 | 8/1997 | Murphy et al. | 504/116 |
| 5,861,524 | 1/1999 | Murphy et al. | 504/116 |

FOREIGN PATENT DOCUMENTS

| | | |
|---|---|---|
| 0 459 512 A2 | 4/1991 | European Pat. Off. |
| 0 648 413 A1 | 4/1995 | European Pat. Off. |

*Primary Examiner*—Richard D. Lovering
*Assistant Examiner*—Daniel S. Metzmaier
*Attorney, Agent, or Firm*—Edward K. Welch, II; Andrew S. Reiskind; Timothy X. Witkowski

[57] ABSTRACT

The present invention teaches silicone polyether copolymers with a low degree of polymerization (3 to 4 Si units) provide control for foams generated by organosilicone based surfactants in water without the need for an additional antifoam component. The copolymer foam control agent is a compound of the formula $$(CH_3)_3SiO[SiO(CH_3)_2]_X[SiOCH_3R^1]_YSi(CH_3)_3$$

wherein X+Y=1 to 2, Y≧1, $R^1$ is an alkyleneoxide group of the formula $C_aH_{2a}O(C_3H_6O)_zR^2$ wherein a=3 to 4, z is 1 to 15, $R^2$ is hydrogen, a hydrocarbon radical of 1 to 4 carbons or acetyl. This invention provides compositions for use in agricultural formulations that give improved foam control for foams generated from organosilicone surfactants in aqueous systems. The copolymer foam control agent is soluble in a surfactant matrix comprised of an organosilicone surfactant alone or in mixtures with short chain conventional surfactants. This invention provides clear, homogeneous, low foaming agricultural formulations having of a water insoluble copolymer foam control agent, and a water soluble or dispersible trisiloxane or tetrasiloxane alkoxylates when said formulation is used in an aqueous mixture.

16 Claims, No Drawings

FOAM CONTROL AGENTS FOR SILICONE SURFACTANTS IN AGRICULTURE

This application claims priority from U.S. Provisional Application No. 60/012,017, filed Feb. 21, 1996. This application is a continuation-in-part of patent application Ser. No. 08/449,452 filed May 24, 1995, now U.S. Pat. No. 5,658,852, which is a divisional of application Ser. No. 08/135,916, filed Oct. 13, 1993, now U.S. Pat. No. 5,561,099.

BACKGROUND OF THE INVENTION

One of the most common deficiencies with agricultural adjuvants comprised of alkoxylated organosilicone surfactants is that foam generated from these products is difficult to control. Organosilicone surfactants, especially trisiloxane alkoxylates (TSA), are able to reduce the aqueous surface tension of spray solutions to values below 21 mN/m. At these low values it is difficult for conventional foam control agents, such as, polydimethylsiloxanes (PDMS), to spread at the liquid/air interface, because the bulk surface tension of these foam control agents is similar to the aqueous surface tension of these organosilicone surfactants.

In a related publication, EP 0046342 discloses the use of an antifoam in a detergent composition containing a PDMS, and a silicone-polyoxyalkylene comb copolymer ("Copolymer"). The Copolymer therein is a spreading agent for the defoamer composition, not a defoamer. U.S. Pat. No. 4,514,319 to Kulkarni et al. also describes the use of a Copolymer as a component in an antifoam composition as a spreading agent and an emulsifier, but not as a foam control agent ("FCA").

SUMMARY OF THE INVENTION

The present invention teaches Copolymers with a low degree of polymerization (3 to 4 Si units) provide control for foams generated by organosilicone based surfactants in water and formulations containing the same without the need for an additional antifoam component. The siloxane alkoxylate ("SA") FCA of the present invention is a compound of the formula

$$(CH_3)_3SiO[SiO(CH_3)_2]_X[SiOCH_3R^1]_YSi(CH_3)_3 \qquad (I)$$

wherein X+Y=1 to 2, Y≧1, $R^1$ is an alkyleneoxide group of the formula $C_aH_{2a}O(C_3H_6O)_7R^2$ wherein a=3 to 4, z is 1 to 15, $R^2$ is hydrogen, a hydrocarbon radical of 1 to 4 carbons or acetyl.

DETAILED DESCRIPTION OF THE INVENTION

It is an object of this invention to provide an SA composition for use in agricultural formulations that gives improved foam control for foams generated from organosilicone surfactants in aqueous systems, especially relative to conventional PDMS based FCA's. It is another object of this invention to provide a water insoluble SA FCA that is soluble in a surfactant matrix comprised of a Copolymer alone or in mixtures with nonsilicon (i.e., not Si based) surfactants. FCA's which are insoluble in the surfactant matrix cause the mixture to phase separate in a short period of time, requiring the applicator to remix the components prior to use to ensure full efficacy and are undesirable. A further object of this invention is to provide a clear, homogeneous, low foaming agricultural formulation having a water insoluble SA FCA, and a water soluble or dispersible TSA when said formulation is used in an aqueous mixture.

The compositions of the present invention are comprised of a surfactant matrix, a SA FCA and optional ingredients which are to be placed in water. Novel low foam agricultural adjuvant compositions comprise a compatible mixture of about 0.1% to about 50% by weight of a SA FCA, and from about 99.9% to 50% by weight of the surfactant matrix. In the formulation, there is the adjuvant composition (i.e., SA FCA and Copolymer surfactant) present in combination with an active ingredient, e.g., a pesticide, at 1–95% by weight of the active ingredient.

SURFACTANT MATRIX

The surfactant matrix is made up of at least one organosilicone surfactant, preferably a trisiloxane atkoxylate, that is dispersible or soluble in water, e.g., 0.025 to 1% by weight solubility in water at room temperature. The organosilicone surfactant is of the structure $R^3(CH_3)_2SiO[SiO(CH_3)_2]_b[SiOCH_3R^3]_cSi(CH_3)_2R^3$ (II) wherein b is 0 to 100, c is 1 to 50 and $R^3$ is an alkyl of 1 to 4 carbons, hydrogen, hydroxyl or a polyether. The polyether may be of 200 to 3000 molecular weight and may be a mix of ethylene oxide (EO) and propylene oxide (PO) with 10 to 90% PO, and between 90 and 10% EO by weight. The polyether may be random or blocked and may be uncapped (i.e., -hydroxy terminated) or capped with an alkyl of one to four carbons or an acetyl. "b" is preferably 0 to 1, most preferably 0, C is preferably 1 to 2, most preferably, 1 and the polyether preferably has a molecular weight between 200 and 600. This surfactant is an agricultural adjuvant and should be selected from those which function as such. For example SILWET L-770® silicone is such a commercially available adjuvant, from OSi Specialties, Inc. of Danbury, Conn.

The surfactant matrix may also incorporate organic based cosurfactants that have an average of less than or equal to ten carbons in the main chain (not including branching from the main chain) of the hydrophobic group. Examples of these short chain surfactants are trimethylnonanol ethoxylates (e.g., TERGITOL® TMN-6, Union Carbide Corporation, Danbury, Conn.), (isodecyl alcohol ethoxylates (e.g., RHODASURF® DA-630, Rhone-Poulenc, Cranberry, N.J.); alkyl polyglucosides (e.g., AGRIMUL® 2067, Henkel Corporation, Cincinnati, Ohio), acetylenic diol ethoxylates (e.g., SURFYNOL® 440, Air Products, Allentown, Pa.). In addition, the surfactant matrix may include polyalkyleneoxide copolymer surfactants, such as copolymers of polyoxyethylene and polyoxypropylene (e.g., PLURONIC® surfactants, BASF Corporation, Parsippany, N.J.). If the cosurfaetant is used, the proportion of the organosilicone surfactant to the organic cosurfactant contained in the surfactant matrix is in the ratio of 1 to 99% by weight of the organosilicone to 99 to 1% of the organic cosurfactant.

COPOLYMER FOAM CONTROL AGENT

The structure of the SA FCA is set forth above at formula (1). The FCA must be insoluble in water at concentrations ≧0.1 wt % and must be soluble or form a stable dispersion (i.e., does not readily phase separate) in the surfactant matrix at greater than 50 wt % at ambient conditions. In the formula above Y is preferably 1, X is preferably 0, a is preferably 3, z is preferably 1 to 5, and $R^2$ is preferably hydrogen.

OPTIONAL INGREDIENTS

Optionally, the composition can include from about 0.1 to 3% by weight of a hydrophobized silica filler, for example, TULLANOX® 500 (Tulco), and AEROSIL® R-812 (Degussa). While such a foam breaking substance may be added, the present composition may be essentially free of FCA's other than the SA FCA.

The composition may also include active ingredients, including, jet dyes, coating resins, permanent press resins or an agricultural active ingredient, e.g., a pesticide. The term "pesticide" as used herein, any compound used to destroy pests, including herbicides, fungicides, insecticides, rodenticides and the like. The term specifically includes oily materials not otherwise toxic but nevertheless used as pesticides in the destruction of aphids, scale insects, and the like by suffocation (e.g., by clogging their spiracles). Illustrative examples of pesticides which can be employed in the present invention include, but are not limited to, growth regulators, photosynthesis inhibitors, pigment inhibitors, mitotic disruptors, lipid biosynthesis inhibitors, cell wall inhibitors, and cell membrane disruptors. Some specific examples of pesticide compounds that can be used in the compositions of the invention are phenoxy acetic acids, pyridate norflurazone: trifluralin; glyphosate, clethodim, flusilazole, permethrin, isoxaben, paraquat, glufosinate, and bromoxynil. The amount of pesticide employed in compositions of the invention varies with the type of pesticide employed and is known to one of skill in the art.

MANUFACTURE

The manufacture of the SA FCA and the Copolymer surfactant are well known in the art. The organic surfactants, silica and pesticides generally are commercially available and are well known in the art to manufacture.

The composition is prepared by combining the components in a desired ratio, and mixing these ingredients according to conventional methods that will provide a clear to slightly hazy, uniform product. Mixing by mechanical agitator or a mechanical shaker are examples of such methods. When the optional silica is included in the composition it is first added to the SA FCA component using high shear mixing, such as a Lightning' mixer.

USE

Compositions of the present invention are intended to be used in agricultural applications. The adjuvant compositions of the SA FCA and the surfactant matrix are added to active ingredient(s) to make up agricultural formulations, e.g., "In-can" formulations. Alternatively, the SA FCA may be added to the active ingredient and surfactant matrix, before or after they are added to water. In such an instance the SA FCA may be added in an aqueous solution or emulsion, or with a solvent such as IPA, dipropylene glycol and the like. Emulsions are made as known in the art and may require standard emulsifiers, though they should contain on average less than 10 carbons in their main chain, not including branching within such chain.

The formulations are mixed with water for use on crops, and generally are added to water at 0.001 to 5 weight percent. The compositions of the present invention will not phase separate in the formulation, so it makes it easy to add the formulation to the water and there will not be an uneven distribution of products when the formulation is added to the water. The compositions of the present invention most preferably are used where foam is a problem such as in mix and spray tanks containing organosilicone adjuvants which are to be spray applied to crops.

EXAMPLES

The following examples are presented to further illustrate and explain the present invention and should not be taken as limiting in any regard. Unless otherwise indicated, all parts and percentages are by weight, and are based on the weight at the particular stage of the processing being described.

Example 1

The preparation of the components of this present invention are described in this example. The SiH intermediates were prepared by acid equilibration as outlined in *Silicones, Chemistry and Technology* (CRC Press, 1991, pages 1 to 6, and U.S. Pat. No. 5,145,879 to Budnik, el. al.). The intermediates were then used to prepare a number of alkyleneoxide modified silicones. A reaction vessel containing 529.3 g (2.379 moles) of an SiH intermediate ($Me_3SiO[MeSi(H)O]_{1.0} SiMe_3$) and 94.1 g (0.578 moles) allyl alcohol propoxylate (AAP) (ARCO Chemical Company, Newtown Square, Pa.) was heated to 90° C. while under a nitrogen blanket. The reaction was catalyzed with 1.5 mL of chloroplatinic acid solution (1.0 wt % in ethanol), based on the total charge. The reaction mixture exotherm was maintained between 90 and 110° C. while the remaining 376.6 g (2.310 moles) of AAP was added dropwise. The reaction mixture was allowed to stir at 100° C. for 20 minutes after the addition of the AAP is complete. The product showed no residual SiH when introduced to a fermentation tube containing KOH/water/ethanol solution. The product was cooled to 70° C. and neutralized with 70 g $NaHCO_3$, and stirred for an additional hour. The product was filtered, and stripped on a Rotovap at 70° C./≦5 mim Hg for 2 hours. The resulting product was a clear pale amber liquid, with a Brookfield viscosity of 10 cps at 25° C., using spindle LV 2 at 60 rpm. This material is shown as SA-1 in Table 1.

Using this procedure, various SA FCA were prepared, having the general structure $(CH_3)_3SiO[SiO(CH_3)_2]_x[SiOCH_3R]_ySi(CH_3)_3$ wherein the values for X, Y and R, the type of alkyleneoxide group contained in the SA component, are varied as listed in Table 1 below.

TABLE 1

Structures of Siloxane Alkoxylate FCA's

| Compound | X | Y | R | Water[1] Soluble |
|---|---|---|---|---|
| SA-1 | 0 | 1 | $C_3H_6O(C_3H_6O)_2H$ | No |
| SA-2 | 0 | 1 | $C_3H_6O(C_3H_6O)_3H$ | No |
| SA-3 | 0 | 1 | $C_3H_6O(C_3H_6O)_{13}H$ | No |
| Comparative Components: | | | | |
| SA-A | 15 | 5.5 | $C_3H_6O(C_3H_6O)_{25}H$ | No |
| SA-B | 70 | 5.2 | $C_3H_6O(C_3H_6O)_{25}H$ | No |
| SA-C | 5 | 7 | $C_3H_6O(C_3H_6O)_{13}Bu$ | No |

[1]Water solubility tested at 0.1 and 5 wt % at 25° C.

Tables 2 and 3 gives a description of the surfactants, which comprise the surfactant matrix of the following examples, either as the sole component or in combination with another surfactant.

TABLE 2

Description of Trisiloxane Alkoxylates

| Component | Description |
|---|---|
| TSA-A | Trisiloxane Ethoxylate, 7.5 EO, Methyl Capped: SILWET L-77 ® |
| TSA-B | Trisiloxane Ethoxylate, 7.5 EO, Uncapped; SILWET ® 408 |
| TSA-C | Trisiloxane Ethoxylate, ~8 EO, Acetyl Capped (Competitive Product) |
| TSA-D | Trisiloxane Alkoxylate, ~6 EO, ~3 PO, Uncapped (Competitive Product) |

TABLE 3

Cosurfactants

| Nonsilicon Surfactant | Description |
|---|---|
| TMN-6 | Trimethylnonanol Ethoxylate, ~6 EO |
| DA-6 | Isodecyl Alcohol Ethoxylate, ~6 EO |
| O-4 | Octyl Alcohol Ethoxylate, ~4 EO |
| AD-30 | Acetylenic Diol Ethoxylate, ~30 EO |
| PAO-1 | Polyalkyleneoxide Copolymer (Block) EO/PO/EO, ~20% EO |

Example 2

Table 4 demonstrates that the SA's of this instant invention provide clear, homogeneous mixtures with the surfactant matrix. The components were combined in a 2 dram vial and mixed with a spatula to provide a uniform mixture. The mixture was allowed to stand undisturbed for 1 hour at ambient temperatures. The clarity of each mixture was determined visually. The SA's of the present invention provide homogeneous mixtures with the various surfactant components, while a conventional silicone oil used as a FCA (PDMS-350), is insoluble in the surfactant matrix.

TABLE 4

Compatibility of Foam Control Agents in Surfactant Matrix

| Component | a | b | c | d | e | f | g |
|---|---|---|---|---|---|---|---|
| TSA-A | 50 | 50 | | | 25 | | 50 |
| TSA-B | | | 50 | | | | |
| TSA-D | | | | 50 | | 25 | |
| SA-1 | 50 | | 50 | | 25 | | |
| SA-2 | | 50 | | 50 | | 25 | |
| TMN-6 | | | | | | 50 | |
| PAO-1 | | | | | | | 50 |
| PDMS-350 | | | | | | | 50 |
| Total | 100 | 100 | 100 | 100 | 100 | 100 | 100 |
| Solubility | Clear | Clear | Clear | Clear | Clear | Clear | Cloudy/ Separates |

Example 3

Table 5 provides the composition of surfactant matrix formulations containing a SA FCA. Foam control was assessed by placing 10 mL of 0.1 wt % of the FCA/surfactant matrix in a 8 dram vial, and agitating the solution on a wrist action shaker for one minute. The foam height was recorded as a function of time. TSA's with the SA FCA were compared to aqueous solutions of the TSA alone.

TABLE 5

Formulation ID Weight Percent

| Component | 1 | 2 | 3 | 4 | 5 | 6 | 7 | 8 | 9 | 10 | 11 | 12 |
|---|---|---|---|---|---|---|---|---|---|---|---|---|
| TSA-A | 80 | 80 | 80 | | | | | | | 80 | 80 | 80 |
| TSA-B | | | | 80 | 80 | | | | | | | |
| TSA-C | | | | | | 80 | 80 | | | | | |
| TSA-D | | | | | | | | 80 | 80 | | | |
| SA-1 | | | 20 | | 20 | | 20 | | 20 | | | |
| SA-2 | | 20 | | 20 | | 20 | | 20 | | | | |
| SA-3 | 20 | | | | | | | | | | | |
| SA-A | | | | | | | | | | 20 | | |
| SA-B | | | | | | | | | | | 20 | |
| SA-C | | | | | | | | | | | | 20 |

Table 6 demonstrates that the inclusion of the SA FCA reduced foam in all cases relative to the TSA without the SA compound. For foams generated by TSA as the sole foaming agent, the SA FCA with 2 PO provided the best control. Foam control ability for the SA FCA proceeds: 2 PO>3 PO>13 PO.

TABLE 6

Foam Control of Trisiloxane Alkoxylate Based Foams

| | | Foam Height (mm) vs Time | | | |
|---|---|---|---|---|---|
| Run No. | Formulation ID | Initial | 1 min. | 5 min. | 10 min. |
| 1 | TSA-A | 10.0 | 8.0 | 6.5 | 6.0 |
| 2 | 1 | 5.5 | 5 | 4 | 3.5 |
| 3 | 2 | 6.5 | 5.5 | 3.5 | 0.5 |
| 4 | 3 | 3.0 | 2.0 | 0 | 0 |
| 5 | 10 | 8.0 | 6.5 | 6.0 | 5.5 |
| 6 | 11 | 10.5 | 9.0 | 9.0 | 8.5 |
| 7 | 12 | 9.5 | 9.0 | 8.5 | 5.5 |
| 8 | TSA-B | 9.0 | 8.0 | 6.0 | 6.0 |
| 9 | 4 | 3.5 | 2.0 | 0 | 0 |
| 10 | 5 | 3.5 | 3.0 | 1.0 | 0 |
| 11 | TSA-C | 11.0 | 9.5 | 8.0 | 7.0 |
| 12 | 6 | 3.0 | 3.0 | 2.0 | 0 |
| 13 | 7 | 4.0 | 3.0 | 1.0 | 0 |
| 14 | TSA-D | 29.0 | 26.0 | 25.0 | 24.0 |
| 15 | 8 | 11.0 | 8.0 | 6.5 | 5.0 |
| 16 | 9 | 11.0 | 6.5 | 3.5 | 1.0 |

Example 4

This example demonstrates the ability of the SA FCA's to control foam in a surfactant matrix composed of an organosilicone surfactant and an organic cosurfactant. Table 7 provides the composition of the surfactant mixtures and the FCA used. Table 8 provides the compositions for the corresponding controls, which do not contain a SA FCA. Table 9 provides the composition of comparative examples, where the FCA is a conventional silicone based oil. Foam control was determined according to the procedure outlined in Example 3. Foam control was evaluated in this example at 0.25 wt % of the compositions described.

TABLE 7

Composition of Low Foam Surfactant Mixtures

| Component | I | II | III | IV | V | VI | VII | VIII | IX | X |
|---|---|---|---|---|---|---|---|---|---|---|
| TSA-A | 40 | 40 | 40 | 40 | 40 | 40 | 40 | 40 | 40 | |
| TSA-B | | | | | | | | | | 40 |
| SA-1 | 10 | | 10 | | 10 | | 10 | | | |
| SA-2 | | 10 | | 10 | | 10 | | 10 | 10 | 10 |
| TMN-6 | 50 | 50 | | | | | | | | |
| DA-6 | | | 50 | 50 | | | | | | |
| O-4 | | | | | 50 | 50 | | | | |
| AD-30 | | | | | | | 50 | 50 | | |

TABLE 7-continued

Composition of Low Foam Surfactant Mixtures

| Component | I | II | III | IV | V | VI | VII | VIII | IX | X |
|---|---|---|---|---|---|---|---|---|---|---|
| PAO-1 | | | | | | | | | 50 | 50 |
| Compatibility[1] | C | C | C | C | C | C | C | C | C | C |

[1.] Compatibility: C = Clear and Compatible

1. Compatibility: C=Clear and Compatible

TABLE 8

Comparative Surfactant Blends w/o Foam Control Components

| | Weight Percent | | | | | |
|---|---|---|---|---|---|---|
| Surfactant | A | B | C | D | E | F |
| TSA-A | 50 | 50 | 50 | 50 | 50 | |
| TSA-B | | | | | | 50 |
| TMN-6 | 50 | | | | | |
| DA-6 | | 50 | | | | 50 |
| O-4 | | | 50 | | | |
| AD-30 | | | | 50 | | |
| PAO-1 | | | | | 50 | |

TABLE 9

Comparative Low Foam Formulations

| Component | AF-A | AF-B | AF-C | AF-D |
|---|---|---|---|---|
| PDMS-350 | 10 | 10 | | |
| SAG 100 | | | 10 | 10 |
| DA-6 | 50 | | | 50 |
| PAO-1 | | 50 | 50 | |
| TSA-A | 40 | 40 | 40 | 40 |
| Total | 100 | 100 | 100 | 100 |
| Compatibility | Cloudy/Separates | Cloudy/Separates | Cloudy/Separates | Cloudy/Separates |

The SA's of the present invention provide foam control equal to or better than the conventional silicone based antifoam compound, with the exception of run number 24 which contains silica (Table 10); however the criteria of compatibility, i.e., solubility in the surfactant matrix, is not met for AF-D (Table 9), while the SA's of this invention provide a compatible mixture (Table 7) with the surfactant matrix, and delivers foam control relative to the surfactant matrix alone.

TABLE 10

Foam Control of Mixed Surfactant Systems

| | | | | Foam Height (cm) | | | |
|---|---|---|---|---|---|---|---|
| Run No. | Surfactant | ID | FCA | Initial | 1 min. | 5 min. | 10 min. |
| 17 | TSA-A/TMN-6 | A | None | 3.2 | 2.8 | 2.3 | 2.1 |
| 18 | TSA-A/TMN-6 | I | SA-1 | 1.5 | 1.2 | 1.0 | 0.85 |
| 19 | TSA-A/TMN-6 | II | SA-2 | 2.0 | 1.4 | 1.3 | 1.2 |
| 20 | TSA-A/DA-6 | B | None | 3.4 | 2.7 | 2.4 | 2.0 |
| 21 | TSA-A/DA-6 | III | SA-1 | 1.8 | 1.6 | 1.3 | 1.2 |
| 22 | TSA-A/DA-6 | IV | SA-2 | 2.9 | 2.6 | 2.2 | 2.0 |
| 23 | TSA-A/DA-6 | AF-A | PDMS-350 | 3.6 | 2.8 | 2.6 | 2.4 |
| 24 | TSA-A/DA-6 | AF-D | SAG 100 | 6.5 | 3.5 | 0 | 0 |
| 25 | TSA-A/O-4 | C | None | 2.8 | 2.5 | 2.2 | 2.0 |
| 26 | TSA-A/O-4 | V | SA-1 | 2.0 | 1.6 | 1.4 | 0.8 |
| 27 | TSA-A/O-4 | VI | SA-2 | 2.8 | 2.3 | 2.1 | 1.0 |
| 28 | TSA-A/AD-30 | D | None | 3.0 | 2.6 | 2.2 | 2.2 |
| 29 | TSA-A/AD-30 | VII | SA-1 | 2.4 | 2.2 | 1.9 | 0.8 |
| 30 | TSA-A/AD-30 | VIII | SA-2 | 2.7 | 2.4 | 2.0 | 2.0 |
| 31 | TSA-A/PAO-1 | E | None | 3.2 | 2.4 | 2.2 | 2.0 |
| 32 | TSA-A/PAO-1 | IX | SA-2 | 2.8 | 2.4 | 2.1 | 2.0 |
| 33 | TSA-B/PAO-1 | X | SA-2 | 2.1 | 1.7 | 1.4 | 1.4 |
| 34 | TSA-A/PAO-1 | AF-B | PDMS-350 | 3.1 | 2.4 | 2.4 | 2.1 |
| 35 | TSA-A/PAO-1 | AF-C | SAG 100 | 2.0 | 1.5 | 1.4 | 1.4 |

Example 5

This example demonstrates the ability of the SA FCAs to reduce existing foam more effectively than a conventional PDMS (silica filled) based antifoam compound, SAG 100. Antifoam concentrates were prepared by combining 97.6 wt % silicone alkoxylate with 2.4 wt % hydrophobic silica D-13 UR58; (Degussa Corp. Dublin, Ohio) in a glass jar and mixing with a spatula until the silica was evenly dispersed. The antifoam compositions of Table 11 were combined with 2-propanol in a 1 ounce jar, using 0.5 g of the antifoam and 9.5 g 2-propanol, and agitated by shaking to disperse the antifoam evenly. Foam control was determined by adding 50 mL of KINETIC® MTF (Helena Chemical, Memphis, Tenn.), an organosilicone based nonionie surfactant blend, to a 250 mL graduated cylinder (with stopper top). The cylinder was inverted 10 times by hand to generate foam. At this point 0.1 g of antifoam solution was added to the cylinder containing the existing foam. The cylinder was inverted two more times to disperse the antifoam solution, and the initial, 5 minute and 10 minute foam volume was determined for each FCA.

TABLE 11

Composition of Antifoam Concentrates

| | Weight Percent | |
|---|---|---|
| Component | AFC-1 | AFC-2 |
| SA-1 | 97.5 | — |
| SA-2 | — | 97.5 |
| Hydrophobic Silica | 2.5 | 2.5 |
| | 100.0 | 100.0 |

Table 12 shows that the SA FCA's of the present invention, provide improved foam control in organosilicone surfactant based foams, relative to the conventional silicone antifoam.

TABLE 12

Effect of 100 ppm Antifoam on Existing Foam

| | | Foam Volume (mL) | | |
|---|---|---|---|---|
| Run No.: | Foam Control Agent | Initial | 5 minute | 10 minute |
| 36 | AFC-1 | 23 | 19 | 18 |
| 37 | AFC-2 | 22 | 16 | 11 |
| 38 | SAG ® 100 | 44 | 35 | 32 |
| 39 | None | 81 | 65 | 62 |

Example 6

The effect of antifoam concentration on foam control is demonstrated in Table 13, for the SA of the present invention relative to the conventional organosilicone antifoam compound. The antifoam compositions of Table 11 (25, 50 and 100 ppm) were added to 50 mL of a 0.25 wt % aqueous solution of KINETIC® MTF. The resulting solution was added to a 250 mL graduated cylinder and inverted 10 times by hand and the foam volume was determined for initially, at 5 and 10 minutes. The SA based antifoam compositions gave enhanced foam control relative to the conventional silicone antifoam compound. The antifoam compositions based on the SAFCA's of this present invention (AFC-1 and AFC-2) required only 25 ppm to provide control that was equivalent to or better than 100 ppm of the conventional antifoam.

TABLE 13

Effect of Antifoam Concentration on Foam Control

| | | | Foam Volume (mL) | | |
|---|---|---|---|---|---|
| Run No.: | Foam Control Agent | ppm | Initial | 5 minute | 10 minute |
| 40 | AFC-1 | 100 | 27 | 17 | 15 |
| 41 | AFC-1 | 50 | 40 | 25 | 23 |
| 42 | AFC-1 | 25 | 48 | 38 | 32 |
| 43 | AFC-2 | 100 | 26 | 18 | 15 |
| 44 | AFC-2 | 50 | 43 | 30 | 20 |
| 45 | AFC-2 | 25 | 59 | 39 | 35 |
| 46 | SAG 100 | 100 | 60 | 46 | 36 |
| 47 | SAG 100 | 50 | 70 | 51 | 41 |
| 48 | SAG 100 | 25 | 71 | 49 | 47 |
| 49 | NONE | 0 | 73 | 62 | 54 |

We claim:

1. A process for reducing foam in a surfactant matrix comprising adding a
(i) a water insoluble siloxane alkoxylate of the formula:

$(CH_3)_3SiO(SiO(CH_3)_2)_X(SiOCH_3R^1)_YSi(CH_3)_3$ wherein X+Y=1 to 2, Y≧1, $R^1$ is an alkyleneoxide group of the formula $C_aH_{2a}O(C_3H_6O)_zR^2$, wherein a=3 to 4, z is 1 to 15, $R^2$ is hydrogen, a hydrocarbon radical of 1 to 4 carbons or acetyl; to (ii) a water soluble or dispersible surfactant matrix comprising at least one organosilicone surfactant.

2. A process according to claim 1 wherein Y=1 and a=3.

3. A process according to claim 1 wherein the at least one organosilicone surfactant of the surfactant matrix comprises a water soluble or dispersible trisiloxane alkoxylate.

4. A process according to claim 3 wherein the organosilicone surfactant of the surfactant matrix (ii) is a polyalkyleneoxide copolymer surfactant, containing between 10 and 90% polyoxyethylene, and between 90 and 10% polyoxypropylene.

5. A process according to claim 3 wherein the surfactant matrix (ii) additionally comprises a non-silicone, organic surfactant at a ratio of 1 to 99% by weight of the trisiloxane alkoxylate to 99 to 1% of the organic cosurfactant.

6. A process according to claim 1 where the siloxane alkoxylate (i) present from 0.1 wt % to 50 wt % and the surfactant matrix (ii) is present from 50 wt % to 99.9 wt %.

7. A process according to claim 6 wherein the siloxane alkoxylate (i) is post added to an aqueous solution of the surfactant matrix (ii).

8. A process according to claim 7 wherein the siloxane alkoxylate (i) is present in an aqueous solution of the surfactant matrix (ii) from 25 ppm to 1.0 wt %.

9. A composition comprising:
(i) a water insoluble siloxane alkoxylate of the formula:

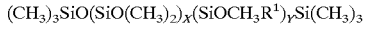

wherein X+Y=1 to 2, Y≧1, $R^1$ is an alkyleneoxide group of the formula $C_aH_{2a}O(C_3H_6O)_zR^2$ wherein a=3 to 4, z is 1 to 15, $R^2$ is hydrogen, a hydrocarbon radical of 1 to 4 carbons or acetyl; and
(ii) a water soluble or dispersible surfactant matrix comprising at least one organosilicone surfactant.

10. A composition according to claim 9 wherein the composition is essentially free of additional foam control agent.

11. A composition according to claim 9 wherein the surfactant matrix (ii) additionally comprises a non-silicon organic cosurfactant.

12. A composition according to claim 11 wherein the organic cosurfactant has a hydrophobe of less than or equal to ten carbons in the main chain thereof.

13. A composition according to claim 9 additionally comprising a pesticide.

14. A composition according to claim 9 which further comprises silica and which is essentially free of additional foam control agent other than silica.

15. A composition according to claim 9 additionally comprising water.

16. The composition according to claim 15 additionally comprising silica.

* * * * *